(12) United States Patent
Schumann et al.

(10) Patent No.: US 10,700,332 B2
(45) Date of Patent: Jun. 30, 2020

(54) SEPARATOR AND GALVANIC CELL PROVIDING ROBUST SEPARATION OF ANODE AND CATHODE

(71) Applicant: Robert Bosch GmbH, Stuttgart (DE)

(72) Inventors: Bernd Schumann, Rutesheim (DE); Jean Fanous, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 764 days.

(21) Appl. No.: 14/884,568

(22) Filed: Oct. 15, 2015

(65) Prior Publication Data
US 2016/0111701 A1    Apr. 21, 2016

(30) Foreign Application Priority Data

Oct. 20, 2014 (DE) .................. 10 2014 221 261

(51) Int. Cl.
| | |
|---|---|
| *H01M 2/16* | (2006.01) |
| *H01M 2/18* | (2006.01) |
| *H01M 10/052* | (2010.01) |
| *H01M 10/0565* | (2010.01) |

(52) U.S. Cl.
CPC ......... *H01M 2/1686* (2013.01); *H01M 2/166* (2013.01); *H01M 10/052* (2013.01); *H01M 10/0565* (2013.01); *H01M 2/1653* (2013.01); *H01M 2/1666* (2013.01); *Y02T 10/7011* (2013.01)

(58) Field of Classification Search
CPC .. H01M 2/1686; H01M 2/166; H01M 10/052; H01M 10/0565
USPC ....................................... 429/144
See application file for complete search history.

(56) References Cited

U.S. PATENT DOCUMENTS

| | | | |
|---|---|---|---|
| 6,528,201 B1 | 3/2003 | Hitomi | |
| 2004/0197641 A1 | 10/2004 | Visco et al. | |
| 2005/0208383 A1* | 9/2005 | Totsuka | H01M 2/162 429/247 |
| 2006/0088769 A1* | 4/2006 | Arora | H01M 2/18 429/247 |
| 2010/0068612 A1* | 3/2010 | Nishikawa | H01M 2/145 429/129 |
| 2012/0196182 A1* | 8/2012 | Yao | H01M 4/60 429/213 |
| 2013/0017432 A1* | 1/2013 | Roumi | H01M 2/1686 429/145 |
| 2015/0140403 A1* | 5/2015 | Moon | H01M 2/166 429/144 |

FOREIGN PATENT DOCUMENTS

| | | |
|---|---|---|
| DE | 10 2011 079 662 | 1/2013 |
| DE | 10 2013 200 848 | 7/2014 |
| DE | 10 2013 203 485 | 9/2014 |
| DE | 10 2013 218 499 | 3/2015 |

* cited by examiner

*Primary Examiner* — Cynthia H Kelly
*Assistant Examiner* — Julian Anthony
(74) *Attorney, Agent, or Firm* — Norton Rose Fulbright US LLP; Gerard Messina

(57) ABSTRACT

A separator having a first polymer diaphragm and a second polymer diaphragm and a layer between the first polymer diaphragm and the second polymer diaphragm including particles featuring low elasticity, the first polymer diaphragm and the second polymer diaphragm being interconnected, which may be periodically, by first support elements. In addition, a galvanic cell and a battery having such a separator are provided.

17 Claims, 1 Drawing Sheet

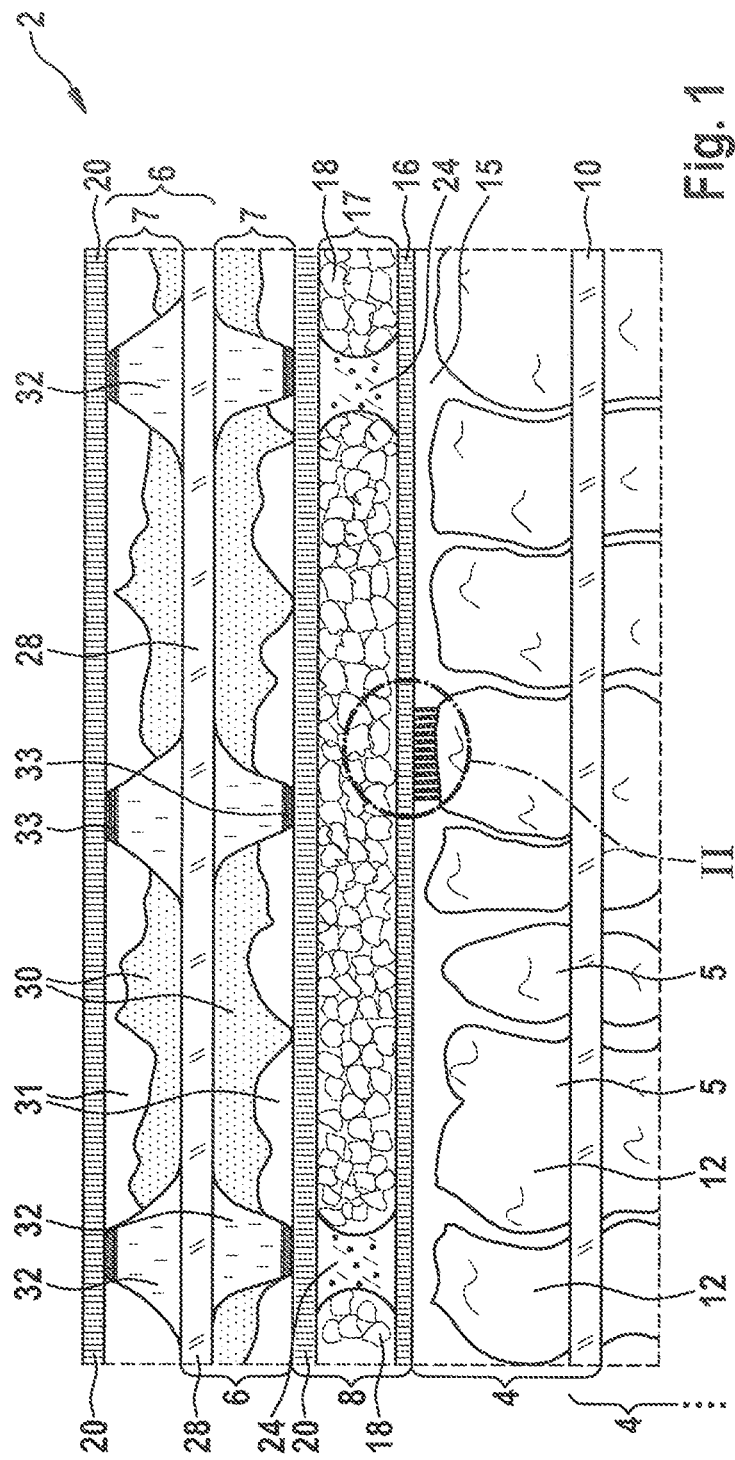
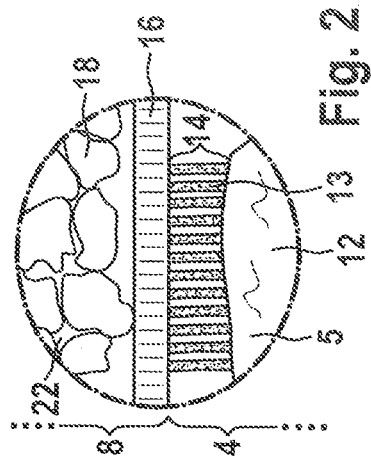

SEPARATOR AND GALVANIC CELL PROVIDING ROBUST SEPARATION OF ANODE AND CATHODE

RELATED APPLICATION INFORMATION

The present application claims priority to and the benefit of German patent application no. 10 2014 221 261.8, which was filed in Germany on Oct. 20, 2014, the disclosure of which is incorporated herein by reference.

FIELD OF THE INVENTION

The present invention relates to a separator, a galvanic cell and a battery.

BACKGROUND INFORMATION

Galvanic cells are believed to be constantly being improved and optimized in order to provide high energy densities and to ensure that they function in a safe and reliable manner. Lithium cells have known disadvantages. Apart from thermal runaway and a fire risk, there is the problem in lithium batteries that dent rides are formed, which not only reduces the performance of the lithium battery but also has the risk that components of the lithium batteries, especially the separator, sustain damage. The problems may lead to a shortened service life of the lithium battery.

The publication U.S. Pat. No. 6,528,201 B1 discusses a separator having a nonwoven fabric, which adheres inside the separator to fine natural rubber particles made of nitrile, chloroprene or chlorosulfonated polyethylene natural rubber. Because of the elastic natural rubber particles, tight contact is established between the electrode plates and the separator and a resistance force is provided for the separator.

SUMMARY OF THE INVENTION

One objective of the present invention is to provide a separator and a galvanic cell whose structure is such that damage to individual components is prevented, if possible, so that optimal and safe operating conditions are present at a high energy density in a manner that is stable across cycles.

According to a first aspect, a separator includes a first polymer diaphragm and a second polymer diaphragm, as well as a layer between the first polymer diaphragm and the second polymer diaphragm, which has particles of low elasticity. The first polymer diaphragm and the second polymer diaphragm are interconnected, which may be periodically, by first support elements.

The low elasticity is defined by an elastic modulus which is greater than that of the polymer diaphragms, or by an elastic modulus of >1 kN/mm$^2$, which may be >5 kN/mm$^2$.

The first polymer diaphragm and the second polymer diaphragm may be produced from various polymers which are used for separators known from the related art. Such polymers may be porous and galvanically stable; for example, nylon, polyester, polyethylenes, polypropylenes, polytetrafluoroethylenes or similar fluorinated polymers, polyvinyl chlorides, polymethacrylates or naturally occurring substances such as natural rubber are used. The thickness, pore size and permeability of the first and second polymer diaphragms may vary depending on the specific embodiment of the present invention.

The first polymer diaphragm and the second polymer diaphragm are interconnected, which may be periodically, by the first support elements. The first support elements therefore protect the separator from forces acting from the outside, especially against deformations. The first support elements, for example, may be configured in the form of columns, bridges or drops, or they may also have conical or cylindrical forms. The dimensions of the first support elements may vary in width, length and diameter. The first support elements have an insulating design. The support elements may be configured to be ionically conductive.

The particles having low elasticity are held together under pressure by the polymer diaphragms and form a bed, the particles being difficult to move under the influence of a force. Since the particles have low elasticity, they endow the separator with a high mechanical load-bearing capacity. In the event that dendrites are created on the anode and these dendrites touch the separator, the separator will not break; ideally, at most individual particles that make up the separator become loose, but the remaining particles continue to stay together in a stable manner and are able to maintain the insulating function of the separator. The dendrites are bent back in the process or, for instance, are deflected perpendicular to the layer sequence.

The particles having low elasticity may include ion-conducting particles and especially may be produced from oxidic, sulphidic, sulphidic-phosphidic or phosphatic ion conductors or mixtures thereof. The particles having low elasticity may be evenly distributed across the separator during the production process, which ensures a homogeneous ion conductivity in the separator.

In addition, for example, the layer may include a binding agent or an ion-conducting material, especially a lithium-phosphorus-sulphur ion conductor, which may be sulphidic glass. The combination of a binding agent or a lithium-phosphorus sulphur ion conductor with low elasticity particles results in a dough-like consistency, which disperses the energy of an acting force or vibrations. Moreover, the separator has higher bending flexibility, which in turn is able to prevent damage to the separator.

In addition or as an alternative, an interspace between the low-elasticity particles may be filled at least partially with an electrolyte, an ion-conducting gel, especially a polyethylene oxide oxide-ion-conducting gel, and/or a block copolymer made of an ion-conducting polymer and a scaffold-forming polymer. Examples of ion-conducting polymers are polyalkylene oxides, polysiloxanes, polyphosphazenes, as well as polymers with side-groups made up of those functional groups or their derivatives, and other ion-conducting polymers known from the related art. Any electrolytes or ion-conducting gels known from the related art may be used in general. The block copolymers in the interspaces allow a slight movement of individual particles having low elasticity, for the already mentioned reasons.

In addition or as an alternative, the layer of the separator includes a fiber network. The fiber network functions as a net for the low elasticity particles by holding them in position. When a force is acting, it allows a slight movement of the particles. The fiber network is galvanically stable and, for instance, may be made from a conductive or non-conductive material, e.g., from a polymer, from glass or a natural product. The fiber network may possibly be provided only in those regions where higher physical stressing is to be expected. Depending on the specific embodiment of the present invention, the fiber network may vary in thickness, the number of nodes and homogeneity.

The first polymer diaphragm and/or the second polymer diaphragm may be produced from a lithium-stable polymer or a voltage-stable polymer, which may be stable in response to voltages of more than 4.0V, especially may be stable in response to voltages of more than 4.6V. Examples of suitable polymers known from the related art are nylon, polyester, polyethylene, polypropylene, polytetrafluoroethylene or similar fluorinated polymers, polyvinyl chlorides, polymethyl methacrylates, polyimides or naturally occurring substances such as natural rubber.

In addition, a thermochemical adhesive agent may be situated between the first polymer diaphragm and the first support elements, and/or between the second polymer diaphragm and the first support elements. The adhesive agent holds the first support elements and the first and second outer diaphragm in position and improves the overall rigidity and form of the separator. The adhesive agent may be applied on the contact surfaces of the first support elements and/or on the first and second outer diaphragm layer within the course of a serial production, prior to a thermochemical bonding process, and at the same time be cured or retroactively chemically linked with the layer of the separator including a binding agent, for instance.

According to one further aspect of the present invention, a galvanic cell includes one of the previously described separators, as well as a cathode including a first active material and a first current collector, the cathode adjoining the first polymer diaphragm; it also includes an anode having a second active material and a second current collector, the anode adjoining the second polymer diaphragm.

The anode may be a metallic anode or include a lithium-intercalating material, e.g., graphite. As a rule, the anode may be made of any material known from the production of lithium-ion anodes. Second active materials or anode-active materials could include lithium, magnesium, iron, nickel, aluminum, zinc or compositions thereof, or any material that gives up electrons and can generate an ion flow. Silicon, germanium, lithium, a carbon-containing material such as graphite or amorphous carbons or a metal alloy are advantageous as second active material. Hybrid electrodes having lithium alloy components are also common. The second current collector is produced from metal, such as copper, for instance.

The second current collector may be connected, which may be periodically, to the second polymer diaphragm of the separator via second support elements.

The second support elements, for example, may have the shape of columns, bridges or drops, or also a conical or cylindrical form, and thus provide an adequate structure, so that the second current collector is set apart from the separator at a sufficient distance. The dimensions of the second support elements may vary in width, length and diameter. The second support elements may be produced by printing, spraying, photochemical processes, etching processes or bonding, for example.

Because of the second support elements, the separator and the volume between the second current collector and the separator are protected from forces acting from the outside, for instance from deformation.

The second support elements of the galvanic cell may be configured to be electrically insulating or electrically conductive; in the second case, insulating regions are provided on the second support elements, which may be at the extremity, i.e., at the contact surfaces with the separator. It is may also be the case that a space is provided between the second current collector and the second polymer diaphragm of the separator, to accommodate the second active material.

The clearances between the second support elements, and the size of the support elements are selected in such a way that the space between the second current collector and the separator is able to accommodate the lithium ions. In case of the metallic anode, metallic lithium deposits as the second active material in the volume between the second current collector and the separator.

The space between the second current collector and the separator may be larger than a total volume of the second active material. In addition to the second active material, a further material, in particular an ion-conducting gel, an ion liquid or an electrolyte, may be situated in the space of the anode between the second current collector and the second polymer diaphragm of the separator. In the event that the lithium metal is growing at the second current collector, the further material between the second current collector and the separator escapes into a volume that is situated on the side thereof and is likewise insulated with respect to the cathode.

A first active material or cathode-active material may refer to any active material that is suitable for such a use. For example, materials of this type may include metal oxides such as lithium-cobalt oxide, lithium-nickel-cobalt oxide, lithium iron phosphate, or lithium manganese oxide or sulphur or a similar material. Oxidic materials, especially lithium cobalt dioxide ($LiCoO_2$), lithium iron phosphate ($LiFePO_4$), lithium manganese oxide spinel ($LiMn_2O_4$) or nickel-containing mixed oxides are suitable first active materials.

Nickel/manganese/cobalt/aluminum mixed oxides, lithium-metal phosphates, lithium manganese spinels or sulphur as well as sulphur compounds are being used. Any mixtures thereof are possible and in use. One first active material may be a polyacrylonitrile-sulphur composite material (S-PAN), and sulphur forms encapsulated in nano-carbon structures such as nanotubes or nanospheres, or sulphur composites are likewise possible.

According to one specific embodiment, the cathode includes a porous ion-conducting structure, which has reservoirs having the first active material. Within the framework of the present invention, the porous, iron-conducting structure of the cathode designates a structure which is permeable for an ion flow and may have open pores. The pores form a duct network, which enables a movement of ions, ion-conducting gels, ionic fluids or an electrolyte. The pores may be created by conventional foaming or reaction processes, and the pore size can be specified by warming, heating or by sinter methods.

The porous ion-conducting structure may be produced from a carbon material, a conductive metal oxide, a metal, a conductive mixture of metal and carbon, a conductive mixture of a metal and a conductive metal oxide, a conductive mixture of a carbon and a conductive metal oxide, or a conductive mixture of a carbon and a catalytically active metal oxide, the conductive metal oxide in particular and may be doped tin oxide as the case may be.

The porous ion-conducting structure includes reservoirs having the first active material. The reservoirs form closed regions or regions within the porous ion-conducting structure which are interconnected by ducts, in which the first active material is able to be stored, deposited and/or is able to undergo a reaction therewith. Charge and discharge rates can be established by specifying the reservoir size and the size of the further pores of the porous ion-conducting structure, so that the capacity of the galvanic cell is controllable.

The reservoirs may be set apart from the separator, for instance by a region of the cathode which may have a duct-type support structure.

According to one further aspect of the present invention, a battery includes one or more of the described separator(s)

or galvanic cell(s). Multiple cells may be present in the form of a cell stack, in which at least two such galvanic cells are stacked on top of each other and share a common first or second current collector in each case. This allows an optimal space utilization and the material for the current collector may be saved. Such a battery is able to be used in electric vehicles, tablets, notebooks and smartphones, for example. Within the framework of the specification, the term battery is used in the conventional sense and also encompasses accumulators.

Using low elasticity particles in the separator improves the ability of the separator to absorb forces acting from the outside and to become more flexible in response to local bending forces and pressure forces. Such a separator is more impervious to damage and retains its resistance, in particular with respect to dendrites from a metal anode, such as a lithium anode.

The use of support elements further improves the structural and mechanical load-bearing capacity of the separator. Acting forces are distributed to a larger surface by the embedded solid particles. Deformations by forces acting from the outside and, ultimately, damage to the separator are prevented in this manner.

The defined structure provided by the second support elements of the anode also has the result that the lithium is able to be deposited uniformly on the second current collector during the charging operation, since it is more difficult for it to grow in the form of dendrites. In the discharge, the lithium material is uniformly decomposed. This allows the galvanic cell to output current of a uniform magnitude. Because of the uniform structure of the second active material on the anode, the risk of short-circuits between the anode and the cathode is minimized in addition and, in particular, also the number of dendrites.

Specific embodiments of the present invention are depicted in the drawings.

BRIEF DESCRIPTION OF THE DRAWINGS

FIG. 1 shows a sectional side view of a galvanic cell including a separator according to the present invention.

FIG. 2 shows a detailed view of a region A shown in FIG. 1.

DETAILED DESCRIPTION

Identical or similar components are designated by the same or similar reference numerals in the following descriptions of the exemplary embodiments of the present invention, and a repeated description of these components is omitted in individual cases. The figures represent the subject matter of the present invention only schematically.

FIG. 1 shows a sectional side view of a galvanic cell 2 according to the present invention.

Galvanic cell 2 includes a cathode 4, an anode 6, and a separator 8, which physically separates cathode 4 and anode 6 from each other for the purpose of electrical insulation. A main function of separator 8 is to insulate anode 6 and cathode 4 from each other, to prevent electrical short circuits, and to allow ion flows at the same time in order to close the current circuit in galvanic cell 2. Separator 8 forms a selective barrier, which allows the passage of ions and prevents cathode or anode components from passing through.

Cathode 4 includes a first current collector 10 and a porous, ion-conducting structure 15, a first active material 12 of cathode 4 being situated in reservoirs 5 which are part of porous, ion-conducting structure 15.

Separator 8 has a layer 17 which includes particles 18 featuring low elasticity between a first polymer diaphragm 16 and a second polymer diaphragm 20, which are likewise assigned to separator 8. First polymer diaphragm 16 is situated on the side that faces cathode 4, and second polymer diaphragm 20 is situated on the side that faces anode 6. Particles 18 having low elasticity, for example, are made of oxidic, sulphidic, sulphidic-phosphidic or phosphatic ion conductors or mixtures thereof. In some instances layer 17 includes a binding agent and/or a lithium-phosphor-sulphur ion conductor.

First support elements 24 connect first polymer diaphragm 16 to second polymer diaphragm 20. First support elements 24 may be disposed periodically, i.e., at a fixed physical distance from each other, and may be produced from an electrically insulating material. In the illustrated case, first support elements 24 are produced from an ionically conductive material.

A space 7 for accommodating second active material 30, such as metallic lithium, is situated between a second current collector 28 of anode 6 and second polymer diaphragm 20 of separator 8. Space 7 in illustrated galvanic cell 2 is filled with second support elements 32 and partially with second active material 30 of anode 6, and partially with a further material 31, such as an electrolyte or an ion-conducting gel, for example. The quantity of second active material 30 and further material 31 varies, in particular as a function of the charge state of galvanic cell 2. When the metallic lithium is growing in the form of a lithium layer, further material 31 escapes to the side, i.e., perpendicularly to the illustrated layer sequence having anode 6, separator 8 and cathode 4.

Second support elements 32 of anode 6 may be produced from an insulating material. In the case illustrated, second support elements 32 are produced from a conductive material and covered by insulating regions 33.

FIG. 1 shows a layer sequence in which a further anode 6, which shares second current collector 28 with the already described anode 6, is situated above anode 6. Further anode 6 may be produced in mirror symmetry with the already described anode 6 with respect to second current collector 28. Sketched above further anode 6 is second polymer diaphragm 20 of a further separator 8. In an analogous manner, a further cathode 4 is sketched below cathode 4, which shares first current collector 10 with already described cathode 4. Further cathode 4, too, may be produced in mirror symmetry with the already described cathode 4 with respect to first current collector 10.

In this way galvanic cell 2 may have a multitude of layers disposed on top of each other.

FIG. 2 is a detail view of a region A shown in FIG. 1. FIG. 2 in particular shows a region 14 between reservoirs 5 having first active material 12 and first polymer diaphragm 16 of separator 8.

A support structure 13, which, for example, includes ducts that reach from first polymer diaphragm 16 to reservoirs 5, is situated in region 14. Separator 8 is resting on support structure 13.

In addition, FIG. 2 shows particles 18 having low elasticity of separator 8 and an interposed interspace 22, which is at least partially filled with an electrolyte, an ion-conducting gel, especially a polyethylene oxide oxide-conducting gel, and/or a block copolymer made of an ion-conducting polymer and a scaffold-forming polymer.

The present invention is not restricted to the exemplary embodiments described and the aspects stressed therein.

Instead, a multitude of variations that lie within the scope of the actions of one skilled in the art are possible within the framework indicated by the claims.

What is claimed is:

1. A separator, comprising:
a first polymer diaphragm;
a second polymer diaphragm; and
a layer between the first polymer diaphragm and the second polymer diaphragm including particles having low elasticity;
wherein the first polymer diaphragm and the second polymer diaphragm are interconnected by first support elements;
wherein the low elasticity corresponds to an elastic modulus greater than that of the first and second polymer diaphragms;
wherein a majority of a space of the layer is occupied by the particles;
wherein the particles having low elasticity are disposed outside of a material of the first support elements and are disposed in a region that is between adjacent ones of the first support elements.

2. A battery, comprising:
a galvanic cell having a separator, including:
a first polymer diaphragm;
a second polymer diaphragm; and
a layer between the first polymer diaphragm and the second polymer diaphragm including particles having low elasticity;
wherein the first polymer diaphragm and the second polymer diaphragm are interconnected by first support elements;
wherein the low elasticity corresponds to an elastic modulus greater than that of the first and second polymer diaphragms;
wherein a majority of a space of the layer is occupied by the particles;
wherein the particles having low elasticity are disposed outside of a material of the first support elements and are disposed in a region that is between adjacent ones of the first support elements;
a cathode having first active material and a first current collector, the cathode adjoining the first polymer diaphragm; and
an anode having a second active material and a second current collector, the anode adjoining the second polymer diaphragm.

3. The separator of claim 1, wherein the first polymer diaphragm and the second polymer diaphragm are interconnected periodically by the first support elements.

4. A separator, comprising:
a first polymer diaphragm;
a second polymer diaphragm; and
a layer between the first polymer diaphragm and the second polymer diaphragm including particles having low elasticity;
wherein the first polymer diaphragm and the second polymer diaphragm are interconnected by first support elements, wherein the particles having low elasticity are made of sulphidic and/or sulphidic-phosphidic ion conductors or mixtures thereof with phosphatic ion conductors, and wherein the particles having low elasticity are disposed outside of a material of the first support elements and are disposed in a region that is between adjacent ones of the first support elements.

5. The separator of claim 1, wherein the layer includes a fiber network.

6. The separator of claim 1, wherein at least one of the first polymer diaphragm and the second polymer diaphragm is made from a lithium-stable polymer or a voltage-stable material.

7. The separator of claim 1, wherein an interspace between the low-elasticity particles is filled at least partially with an electrolyte, an ion-conducting gel, especially a polyethylene oxide oxide-ion-conducting gel, and/or a block copolymer made of an ion-conducting polymer and a scaffold-forming polymer.

8. The separator of claim 1, wherein the particles having low elasticity form a bed between the first and second diaphragm layers.

9. The separator of claim 1, wherein a majority of a surface of at least one of the first and second diaphragm layers facing the layer is in contact with the particles having low elasticity.

10. The separator of claim 1, wherein the lithium-phosphorus-sulphur ion conductor is a sulphidic glass.

11. The separator of claim 5, wherein the fiber network serves as a net for holding the particles in place.

12. The separator of claim 1, wherein a thermochemical adhesive agent is situated between the first polymer diaphragm and the first support elements, and/or between the second polymer diaphragm and the first support elements.

13. A galvanic cell, comprising:
a separator, including:
a first polymer diaphragm;
a second polymer diaphragm; and
a layer between the first polymer diaphragm and the second polymer diaphragm including particles having low elasticity;
wherein the first polymer diaphragm and the second polymer diaphragm are interconnected by first support elements;
wherein the low elasticity corresponds to an elastic modulus greater than that of the first and second polymer diaphragms;
wherein a majority of a space of the layer is occupied by the particles;
wherein the particles having low elasticity are disposed outside of a material of the first support elements and are disposed in a region that is between adjacent ones of the first support elements;
a cathode having first active material and a first current collector, the cathode adjoining the first polymer diaphragm; and
an anode having a second active material and a second current collector, the anode adjoining the second polymer diaphragm.

14. The galvanic cell of claim 13, wherein the second current collector is connected to the second polymer diaphragm of the separator via second support elements, and wherein a space for accommodating the second active material is situated between the second current collector and the second polymer diaphragm of the separator.

15. The galvanic cell of claim 13, wherein the cathode has a porous ion-conducting structure, which includes reservoirs having the first active material.

16. The galvanic cell of claim 13, wherein the second current collector is connected periodically to the second polymer diaphragm of the separator via second support elements, and wherein a space for accommodating the second active material is situated between the second current collector and the second polymer diaphragm of the separator.

17. A separator, comprising:
a first polymer diaphragm;
a second polymer diaphragm; and
a layer between the first polymer diaphragm and the second polymer diaphragm including particles having low elasticity;
wherein the first polymer diaphragm and the second polymer diaphragm are interconnected by first support elements, wherein an interspace between the low-elasticity particles is filled at least partially with an ion-conducting gel, and/or a block copolymer made of an ion-conducting polymer and a scaffold-forming polymer, and wherein the particles having low elasticity are disposed outside of a material of the first support elements and are disposed in a region that is between adjacent ones of the first support elements.

* * * * *